(12) United States Patent
Webb

(10) Patent No.: US 6,229,862 B1
(45) Date of Patent: May 8, 2001

(54) SELECTIVE CLOCK RECOVERY FROM PORTIONS OF DIGITAL DATA SIGNAL BEST SUITED THEREFOR

(75) Inventor: William Timothy Webb, Southampton (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/182,035

(22) PCT Filed: Jul. 2, 1992

(86) PCT No.: PCT/GB92/01196

§ 371 Date: Jan. 14, 1994

§ 102(e) Date: Jan. 14, 1994

(87) PCT Pub. No.: WO93/01667

PCT Pub. Date: Jan. 21, 1993

(30) Foreign Application Priority Data

Jul. 2, 1991 (GB) .................................................. 9114246

(51) Int. Cl.[7] .............................. H04L 7/02; H04L 25/00

(52) U.S. Cl. ........................................... 375/359; 375/371

(58) Field of Search .............................. 375/106, 39, 86, 375/99, 101, 75, 102, 14, 264; 328/151; 329/307, 304

(56) References Cited

U.S. PATENT DOCUMENTS

| | | | | |
|---|---|---|---|---|
| 4,520,492 | * | 5/1985 | Weber | 375/86 |
| 4,648,100 | * | 3/1987 | Mardirosien | 375/86 |
| 4,912,726 | * | 3/1990 | Iwamatsu et al. | 375/120 X |
| 5,111,484 | * | 5/1992 | Karabinis | 375/101 X |
| 5,200,981 | * | 4/1993 | Carmon | 375/355 |

FOREIGN PATENT DOCUMENTS 0080020   7/1982   (EP) .
0296253   1/1988   (EP) .

* cited by examiner

Primary Examiner—William Luther
(74) Attorney, Agent, or Firm—Nixon & Vanderhye P.C.

(57) ABSTRACT

A method of recovery timing information and a clock recovery system for digital data signals are described, in which a digital data signal is assessed to determine the occurrence of a peak in part of the signal and the suitability of that peak for providing timing information. In the clock recovery systems described a peak evaluator has a maximum peak detector for determining the maximum oversampled value in a symbol period and the sampling point at which that maximum occurred, and peak score calculator for establishing a measure of the suitability of the peak by assessing the gradients of parts of the peak. The peak score associated with a maximum in the signal is compared with a similarly established minimum peak score by a comparator and the larger provided to a switch which, if the selected score exceeds a threshold, updates a phase lock loop, with the sampling point at which that peak occurred.

23 Claims, 5 Drawing Sheets

SELECTIVE CLOCK RECOVERY FROM PORTIONS OF DIGITAL DATA SIGNAL BEST SUITED THEREFOR

BACKGROUND OF THE INVENTION CLOCK RECOVERY

1. Field of the Invention

The present invention relates to the recovery of timing information from a digital data signal, in particular, though not exclusively, to the recovery of timing information from analogue processed digital data signals.

2. Related Art

Accurate recovery of timing information is necessary for the processing of digital data. Where digital data has undergone some form of analogue processing e.g. to form a radio frequency signal, that recovery becomes difficult. With modulation techniques such as Quadrature Amplitude Modulation (QAM) accurate clock recovery is essential because of its multilevel constellation. A particular problem for QAM transmissions over mobile radio links is that where a high symbol rate is employed e.g. 8 MBd, significant Inter Symbol Interference (ISI) occurs. This ISI produces a number of complications which render many conventional clock recovery schemes unsuitable. In addition to ISI, the carrier is suppressed in QAM, and the symbol timing is difficult to track because of the deep fades and the violent phase changes that accompany these fades in mobile radio channels. The ISI distorts the received waveform, but equalization prior to the clock recovery circuit cannot be used to remove this distortion as the equalizer would be required to work before the clock recovery system could operate properly, and almost all equalizers require accurate clock recovery for correct operation.

The present invention seeks in particular though not exclusively to provide a clock recovery system which operates on signals corrupted with ISI. This would make receiver operation more robust, allow an equalizer to function in isolation, and thereby avoid the problems caused by clock recovery/equalizer interaction.

A known method is early-late (EL) clock recovery. As the correct sampling time in most modulation schemes is at the peaks of the incoming signal and these peaks are normally symmetrical, the EL clock recovery system tries to detect any asymmetry in the incoming signal around the current sampling point. It does this by taking two samples of the incoming waveform, one just before the current sampling time, and one just after it. If the pulse is symmetrical and the sampling time is correct then the magnitude of these two samples will be the same. The EL system subtracts one sample from the other and uses the difference signal to update a phase locked loop (PLL). The incoming signal must first be squared to make all peaks positive as otherwise the error signals would have different polarities for positive and negative peaks.

A major problem with EL clock recovery for QAM transmissions is that not all QAM sequences result in peaks occurring every sampling period. Further, half the peaks are of the wrong polarity for the clock recovery technique. This problem is illustrated in FIGS. 1(a)–1(c) where the polarity of the early signal minus the late signal is considered for a number of QAM sequences when in all cases the sampling point is too early. Consequently, the early signal minus the late signal should be negative, and this is represented in FIGS. 1(a) and(c) as "E–L Negative". In these examples we consider only the I channel for simplicity. The practical implementation of this scheme would have independent EL recovery systems for both the I and Q channels, except that they would drive the same PLL.

In FIG. 1(a) we observe the QAM sequences 1,3,1 and –1, –3, –1, where the first number refers to the modulation level on the channel I transmitted in the symbol period prior to the one in which we are attempting peak detection. The second number in the sequence refers to the modulation level in the symbol period in which we attempt peak detection, while the third number refers to the modulation level in the symbol period after the one in which we attempt peak detection. Note we are not considering an oversampled waveform but three independent symbols. Squaring these sequences, which is an integral part of EL process, results in correct E-L polarity.

In FIG. 1(b) we observe the sequences 3,1,3 and –3, –1, –3 It can be seen that despite sampling occurring early as in (a), the E-L value is of the opposite polarity to (a).

Also problematic are sequences such as –1, 1, 3 and 3,–1, 3 shown in FIG. 1(c) where the monotonic waveform leads to negative early-late difference signals regardless of whether the sampling is early or late.

The consequence of this is that the early-late difference signal which should be negative in this case, is correct for only a fraction of the transmitted symbols. The peaks of the type in FIG. 1(b) will cause an incorrect signal to be generated, and the monotonic waveforms of FIG. 1(c) will on average cause an equal distribution of correct and incorrect signals. This makes it difficult for the system to maintain lock.

BRIEF SUMMARY OF THE INVENTION

According to a first aspect the invention provides a method of recovering timing information from a digital data signal, characterized by periodic assessment of the signal to determine the suitability of a part of the signal for providing timing information.

According to a second aspect the invention provides a method of recovering timing information from a digital data signal, comprising the steps of:

a) assessing whether a part of the signal has one or more characteristics indicative of the suitability of that part of the signal for providing timing information; and b) determining a timing point from a part of the signal having said at least one characteristic.

According to a third aspect of the invention there is provided a clock recovery system for recognising timing information from a digital data signal comprising:

a peak detector for establishing the occurrence of a peak in a part of the signal;

a peak evaluator for determining the suitability of the peak for providing timing information; and means for providing timing information for updating a clock on the basis of the occurrence of a suitable peak in the digital data signal.

BRIEF DESCRIPTION OF THE DRAWINGS

Preferred embodiments of the invention will be now be described by way of example, and with reference to the accompanying drawings, wherein.

DETAILED DESCRIPTION OF EXEMPLARY EMBODIMENTS

Figure 1:
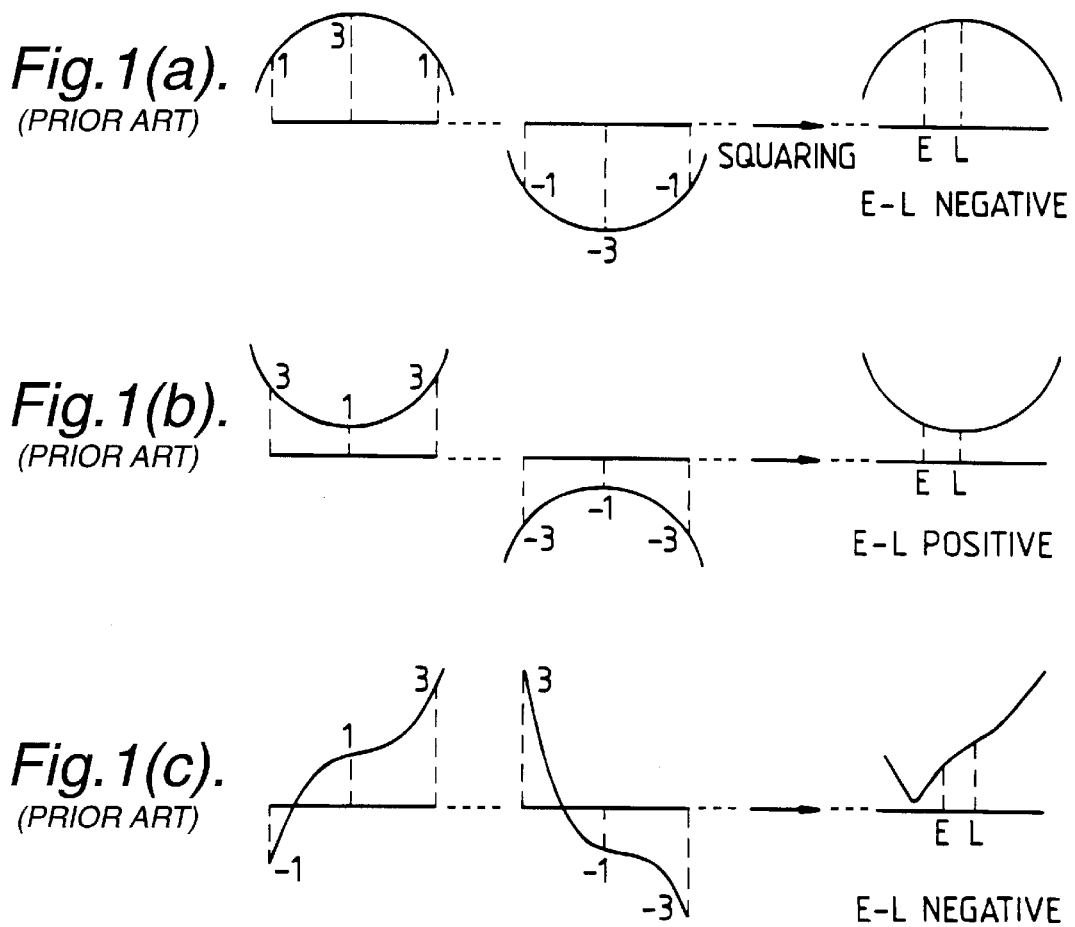
FIGS. 1(a)–1(c) illustrates the potential application of Early-Late clock recovery to QAM sequences.
Figure 2:
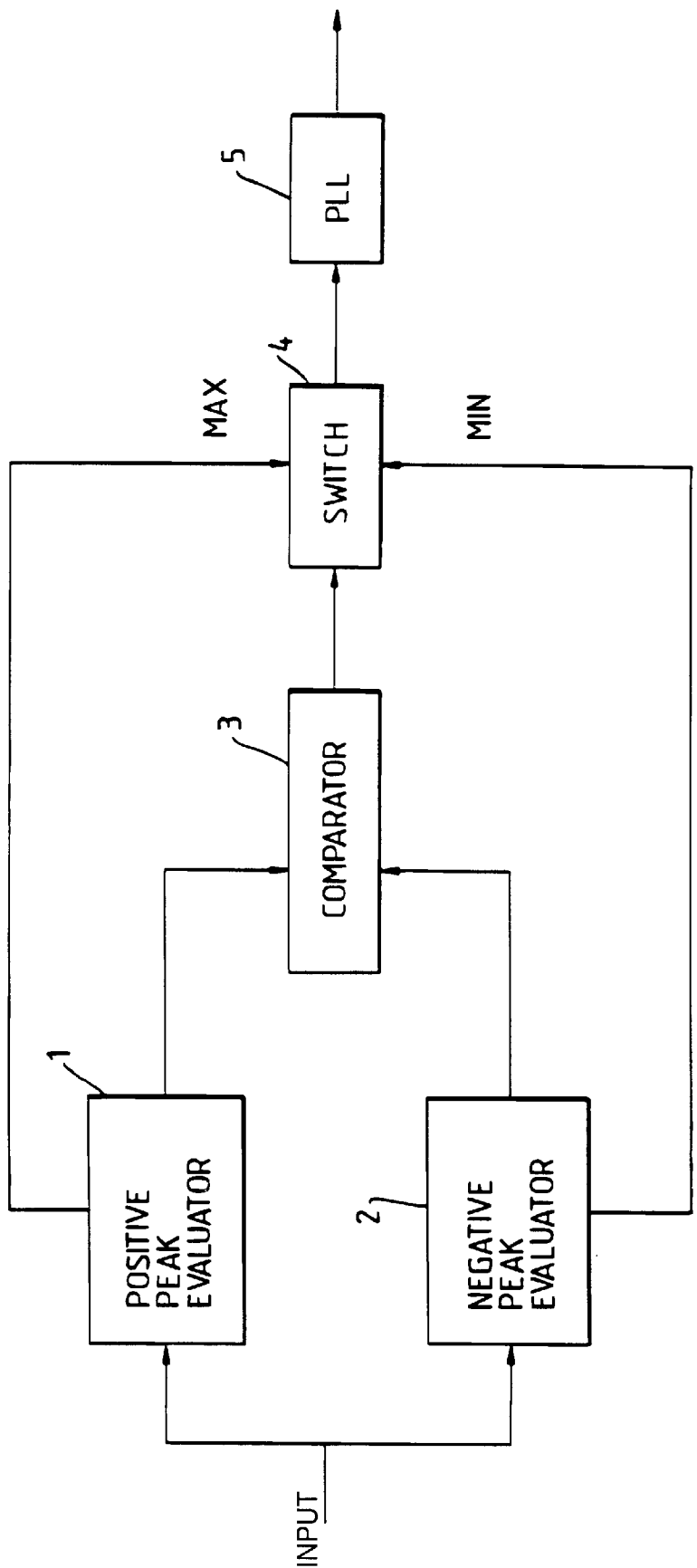
FIG. 2 illustrates schematically, in general terms, a first embodiment of the invention.
Figure 3:
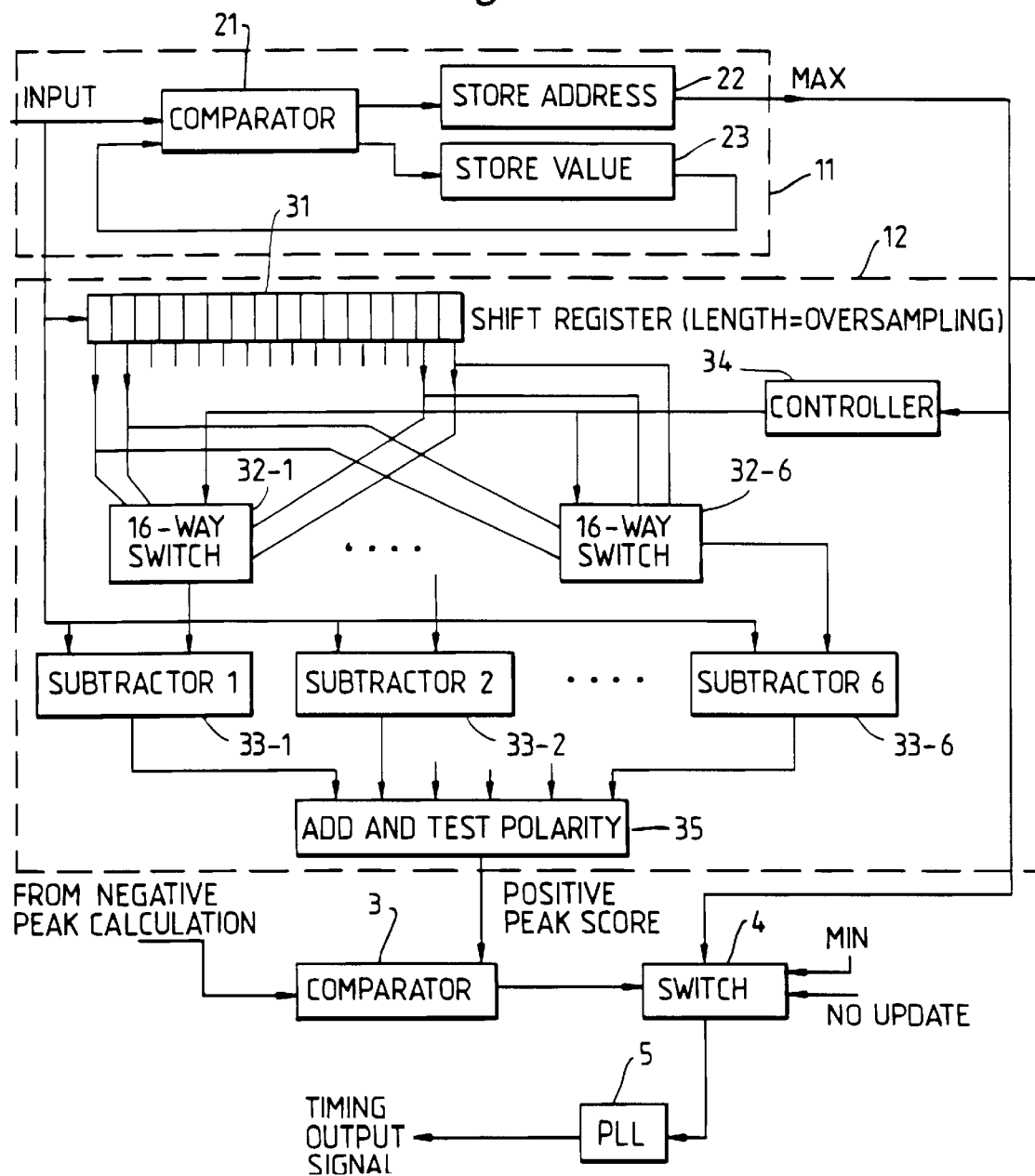
FIG. 3 illustrates schematically part of a clock recovery system of the FIG. 2 embodiment.

Referring to FIGS. 2 and 3, and initially in particular to FIG. 2, a clock recovery system of the first preferred embodiment has positive and negative peak evaluators 1 and 2 connected to receivers as input oversampled measurements of a received QAM signal. The positive and negative peak detectors each have their output connected to a comparator 3 which is connected to switch 4 which is in turn connected to a phase lock loop controlled 5 for a system clock (not illustrated). The positive peak evaluator 1 is illustrated in more detail in FIG. 3, and it will be appreciated that: the negative peak evaluator 2 is essentially the same as the positive peak detector with appropriate changes in polarity.

The positive peak evaluator 1 shown in FIG. 3 has two main parts: a peak detector 11 and a peak score calculator 12.

The peak detector 11 has a comparator 21 and storage units, store address 22 and store value 23. The peak detector is for ascertaining at which oversampling period during the current symbol period the maximum input value occurred. The current input value is compared by comparator 21 with the current maximum value observed during a symbol period, the latter being stored in the unit store value 23. If the current input value exceeds the current maximum value then the comparator triggers the store value unit 23 to be updated with the new maximum value and also triggers the store address unit 23 to store the oversample point at which this maximum value occurred. The maximum oversampling point is used when the overall timing is updated, and provided as output "Max" from peak detector 11.

The peak score calculator 12 has an n-stage shift register 31, where n corresponds to the oversampling rate per symbol period. The shift register 31 is coupled to by an array of six 16-way switches 32-1 to 32-6 to an array of six subtractors 33-1 to 33-6 for forming partial peak scores under the control of controller 34 as will be described below. The subtractors 33 are connected to an adder and polarity checker unit 35 for assessing the partial peak scores and providing a positive peak score as output to comparator 3.

Generally, the oversampled input values are supplied to the shift register 31 so that at the end of a symbol period the input for each over-sample period is available. The subtractors 33 form the partial peak scores as described below, and the final peak score is formed by the adder and sum calculator 35 as also described below. The output from positive peak calculator 12 is a rating of the peak, labelled "Positive Peak Score" in the figure, and this and a "Negative Peak Score" derived in a near-identical way by the negative peak evaluator 2 apart from polarity changes in the comparator and subtractors, are compared by comparator 3 to determine which peak is the strongest and the results of this comparison are passed to switch 4. The switch 4 compares the chosen peak score with a set threshold and if the threshold is not exceeded then the peak is judged to be unsatisfactory and no-update is provided to the PLL 5. If the peak is satisfactory then depending on whether the positive or negative peak has been chosen, the appropriate maximum or minimum oversampling address "Max" or "Min", is selected and used to advance, retard or maintain the state of a PLL 5 appropriately.

The operation of the system in general and the method of derivation of the partial peak scores and the final peak scores derived by the peak calculators will now be given.

The clock recovery system of the first embodiment waits until all n of the oversampled observations for a symbol period have been made and held in shift register 31. The n observations are equally spaced around the current sampling point. The sample point associated with the maximum (and the minimum) sample during that period are held in the store address unit 22 of the peak detector 11. If the maximum is at either end of the sampling period, the search for a positive pulse is discontinued since this implies there cannot be a valid positive peak in the current sampling period. The same applies if the minimum is at either end of the sampling period, indicating there could not be a valid negative peak in the oversampling period.

If there is a valid maximum sample, the gradient on both sides of the peak is calculated and the peak is rated (as described below) depending on the local gradient. A similar rating is calculated for the negative pulse if there is a valid minimum. The peak score calculator 12 selects oversampled values from the symbol period according to the following algorithm for rating the positive peaks:

$$G_{+2}=R_p-R_{p+2}$$

$$G_{+3}=R_p-R_{p+3}$$

$$G_{-2}=R_p-R_{p-2}$$

$$G_{-3}=R_p-R_{p-3}$$

$$G_{+23}=R_{p+2}-R_{p+3}$$

$$G_{-23}=R_{p-2}-R_{p-3}$$

where $R_p$ is the amplitude of the incoming waveform at the peak p and $R_{p+k}$ is the amplitude at the points k oversamples removed from p where k takes the values ±2, ±3. The six G values represent gradients and are the intermediate partial peak scores. We only accept the presence of a positive peak if all of these quantities are positive. This implies that on both sides of the peak the received waveform falls away, and does so with increasing steepness. We do not use the values of R at p±1 as, due to the nature of the pulse shaping, these are very similar to R at p and so the gradient can easily be distorted by noise. If all the past peak scores are positive then we score the peak according to $$p_{score}=G_{+2}+G_{+3}+G_{-2}+G_{-3}$$

where $P_{score}$ is the positive peak score.

Similarly for the negative peaks $$G_{+2}=R_{p+2}-R_p$$

$$G_{+3}=R_{p+3}-R_p$$

$$G_{-2}=R_{p-2}-R_p$$

$$G_{-3}=R_{p-3}-R_p$$

$$G_{+23}=R_{p+3}R_{p+2}$$

$$G_{-23}=R_{p-3}-R_{p-2}$$

and if all these quantities are positive we form $$N_{score}=G_{+2}+G_{+3}+G_{-2}+G_{-3}$$

where $N_{score}$ is the negative peak score.

The peak score with lowest value is then discarded by comparator 3. If there is a valid peak remaining exceeding a predetermined value, the difference between the current sampling time and that associated with the peak is used by switch 4 to update a variable internal clock, the phase locked loop (PLL) system 5. Otherwise the PLL is allowed to continue running at its current level.

Figure 4A:
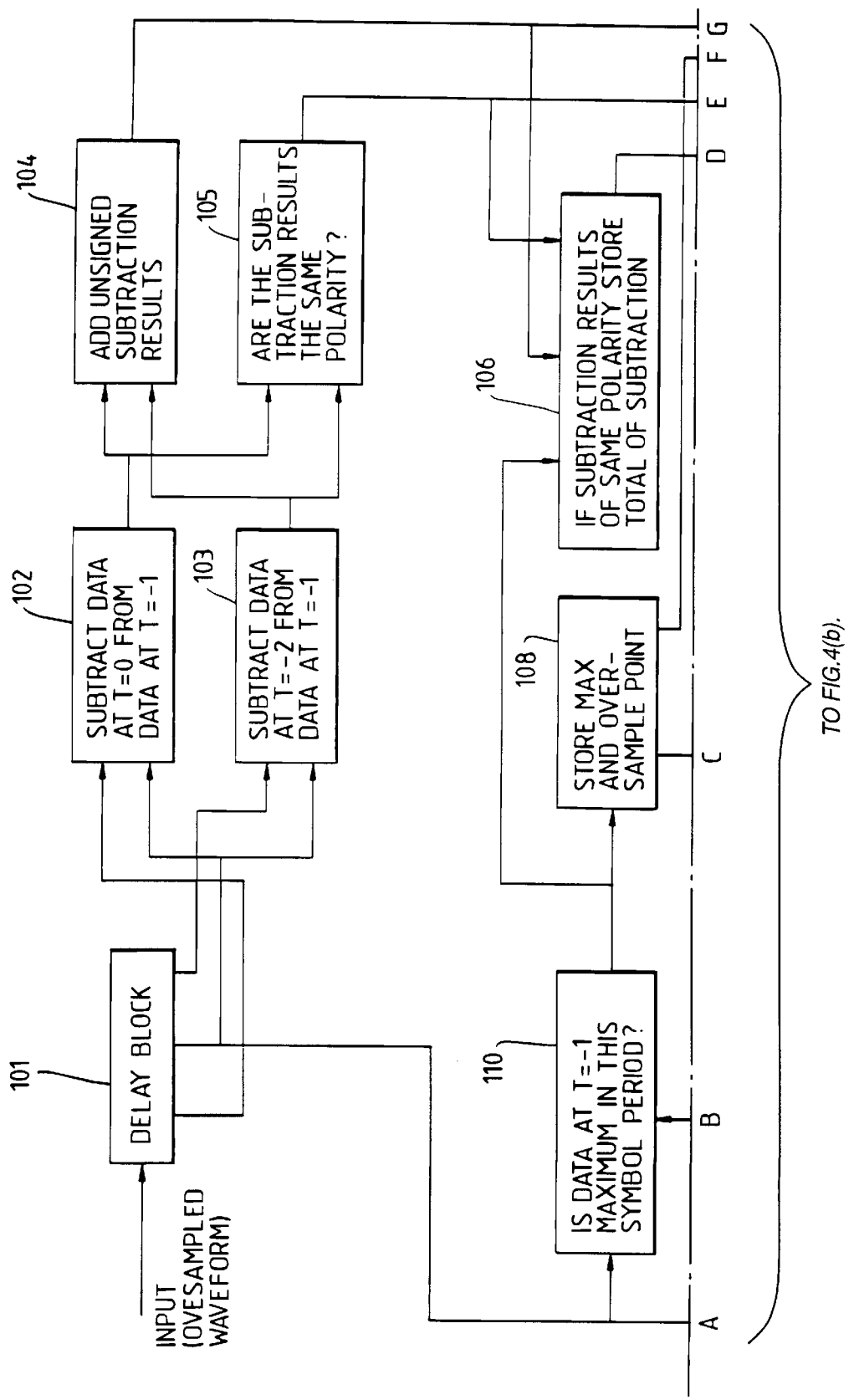
FIGS. 4(a) and 4(b) illustrate schematically a clock recovery system of another embodiment of the invention.
Figure 4B:
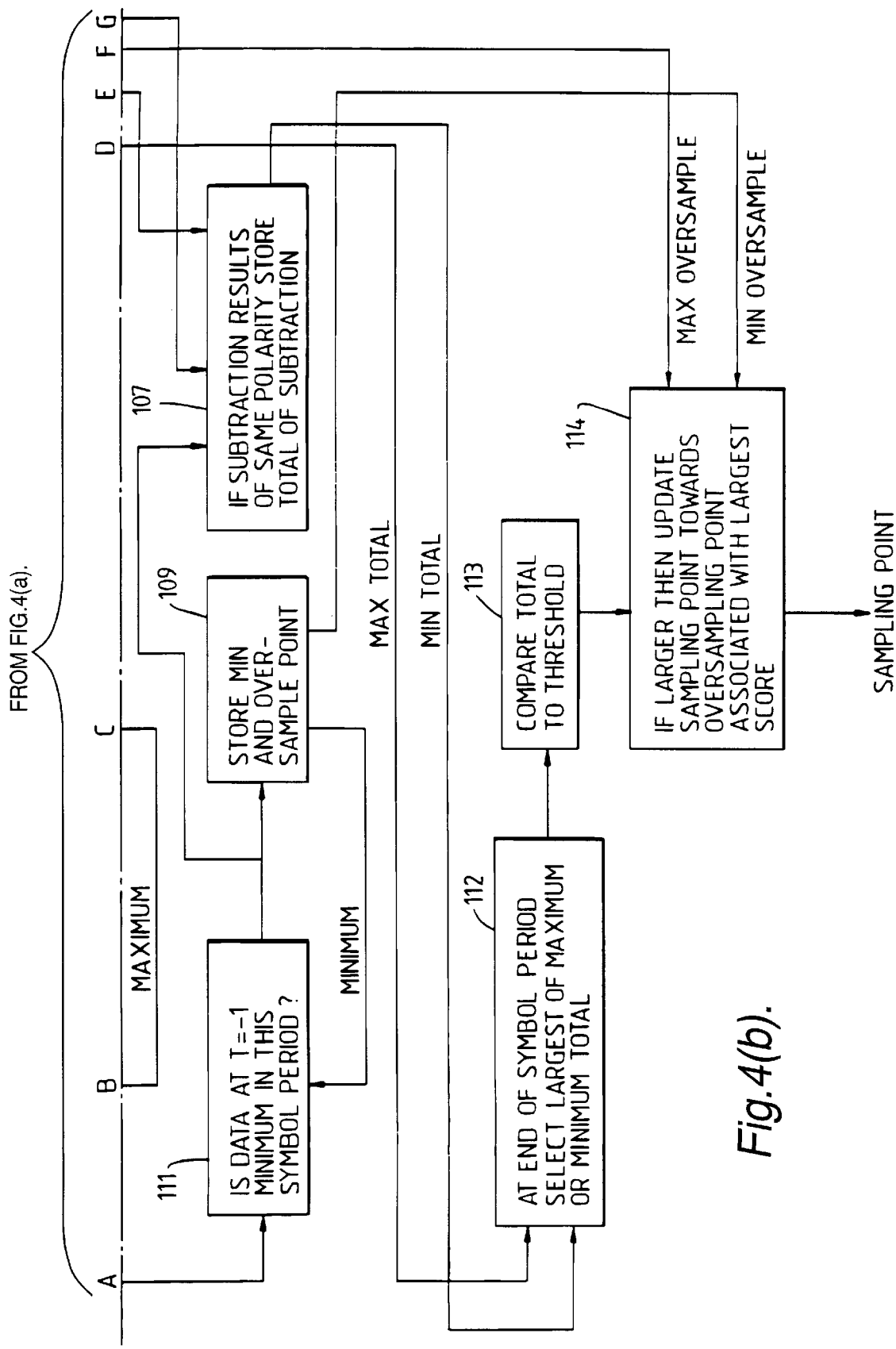

A functional block diagram of the second preferred embodiment is shown in FIGS. 4(a) and 4(b). In the second embodiment the evaluation of maximum and minimum peaks are carried out together, rather than in separate subunits as in the first preferred embodiment.

In this implementation the incoming sampled waveform in, by way of example, 8-bit digital form is fed into a delay block 101 which provides as output the input samples at times T=0, T=−1 and T=−2, i.e. the sample values at the current, and two preceding sampling periods, to a pair of subtracters 102, 103 which calculate respectively the difference between the input at T=−1 and T=0, and at T=−1 and T=−2, representing this difference as a 7 −bit number. The 8th bit of each subtractor's output is used to signal the polarity of the difference. The unsigned difference signals are passed to adder 104, while the polarity signals are passed to polarity checker 105 which determines whether the difference polarity signals are the same or not. The outputs of adder 104 and polarity checker 105 are provided to peak score stores 106 and 107.

The output from delay block 101 at T=−1 is also provided to maximum detector 110 and minimum detector 111, which assess whether the data sample at T=−1 is a maximum or minimum, respectively, in the current symbol period. The maximum detector 110 provides an output to peak store 106, and to a maximum value store 108, while the minimum detector 111 provides an output to peak score store 107, and a minimum value store 109. The maximum and minimum value stores 108, 109 each store the appropriate maximum or minimum value and its sampling point.

The peak score stores 106, 107 are connected to provide outputs to a comparator 112 which in turn provides an output to threshold detector 113. The output of threshold detector 113 is provided to sampling point update unit 114 which is also provided with the maximum and minimum oversampling points from stores 108, 109. The sampling point update unit provides an output to a clock circuit, e.g. to a phased lock loop of the clock circuit.

The operation of the systems second embodiment will now be described. At the start of each symbol period the stores 106, 107, 108 and 109 are reset.

Each maximum detector 110, 111 compares the input at T=−1 with the maximum or minimum in the symbol period so far, and if a new maximum or minimum is observed then the value of this maximum or minimum is stored, along with the oversample point at which it occurred, in store 108 or 109 as appropriate. Also, if a maximum or minimum has occurred, and the polarities from the subtraction process are different as determined by polarity checker 105 a peak has occurred, and then the sum of the differences from adder 104, the "peak score", is stored in store 106 or 107 as appropriate. The difference between subsequent samples are calculated at each sample period as distinct from the first embodiment where calculations are made when a peak is found after all samples for symbol period were collected. In this second embodiment these differences are only stored if a peak has been found. Separate calculations are not required for positive and negative peaks because unsigned differences are used. If no peak has occurred the peak score stores 106, 107 will still be reset, i.e. storing zero at the end of the symbol period.

At the end of the symbol period, comparator 112 compares the score for the maximum peak with the score for the minimum peak from stores 106 and 107, and the larger is selected. Threshold detector 113 compares the selected score with a threshold and if the selected score is large enough the current sample point is updated by unit 114 towards the sample point associated with the selected peak.

This implementation requires only standard digital ICs. Approximately 30–40 simple digital ICs will be required, representing a circuit of low to medium complexity.

What is claimed is:

1. A method recovering timing information from a digital data signal, said method comprising:
   periodic assessment of the signal to determine the suitability of a detected maximum or minimum signal value within a part of the signal for providing timing information and
   recovery of timing information from only the parts of the signal so identified.

2. A method of recovering timing information from a digital data signal, said method comprising the steps of:
   a) assessing whether a part of the signal has a detected maximum or minimum signal shape indicative of the suitability of that part of the signal for providing timing information; and
   b) determining a timing point from a part of the signal having said detected suitability.

3. A method as in claim 2 wherein the step of assessing part of the signal includes assessing that part of the signal for the occurrence of a peak.

4. A method as in claim 3 wherein following the assessment of the signal for the occurrence of a peak in part of the signal, the absence of a peak or the failure of an assessed peak to meet a predetermined criterion is indicative of the unsuitability of that part of the signal for providing timing information.

5. A method as in claim 2, wherein the step of assessing the signal for the occurrence of a peak in part of the signal, includes determining at least an approximation to a gradient of sides of the signal peak being assessed.

6. A method as in claim 5 wherein the step of assessing the signal for the occurrence of a peak includes comparing the at least an approximation to the gradient with a threshold to determine the suitability of that part of the signal to be a peak suitable for providing timing information.

7. A method as in claim 5 wherein the step of assessing the signal for the occurrence of a peak includes determining at least an approximation to the gradient of a number of parts of the signal, and establishing whether those at least approximate gradients jointly or severally meet at least one predetermined criteria.

8. A method as in claim 7 wherein the criteria includes at least one of the approximate gradients changing polarity, and/or the sum of the absolute values of a number of approximate gradients exceeding a threshold.

9. A method as in claim 2 wherein the step of assessing the signal for the occurrence of a peak includes sampling the signal periodically and establishing differences between samples.

10. A method as in claim 9 wherein the differences are established between consecutive samples.

11. A method as in claim 9 wherein the occurrence of a peak is indicated by the occurrence of a change in polarity of the differences between time-adjacent samples in a sequence of such samples.

12. A method as in claim 9 wherein the assessment of a peak includes the formation of a peak score which is the summation of a number of differences between samples in a sequence of such samples.

13. A method as in claim 12 wherein a peak score is compared to a threshold to assess the suitability of that peak for providing timing information.

14. A method as in claim 9 wherein samples associated with a symbol period within the data signal are assessed as the sampling occurs.

15. A method of recovering timing information from a digital data signal, said method comprising the steps of:
   a) assessing whether a part of the signal has one or more characteristics indicative of the suitability of that part of the signal for providing timing information; and b) determining a timing point from a part of the signal having said at least one characteristic;
   wherein the step of assessing the signal for the occurrence of peak includes sampling the signal periodically and establishing differences between samples; and
   wherein the samples associated with a symbol period within the data signal are assessed when all samples for the symbol period are taken.

16. A method as claimed in claim 15 wherein samples associated with a peak are assessed to provide a peak score:

$$P_{score}=G_{+2}+G_{+3}+G_{-2}+G_{-3}$$

where $P_{score}$ is the positive peak score, and $$G_{+2}=R_p-R_{p+2}$$

$$G_{+3}=R_p-R_{p+3}$$

$$G_{-2}=R_p-R_{p-2}$$

$$G_{-3}=R_p-R_{p-3}$$

$$G_{+23}=R_{p+2}-R_{p+3}$$

$$G_{-23}=R_{p-2}-R_{p-3}$$

where $R_p$ is the amplitude of the incoming waveform at the peak p and $R_{p+k}$ is the amplitude at the points k oversamples removed from p where k takes the values ±2, ±3 or $$N_{score}=G_{+2}+G_{+3}G_{-2}+G_{-3}$$

where $N_{score}$ is the negative peak score, and $$G_{+2}=R_{p+2}-R_p$$

$$G_{+3}=R_{p+3}-R_p$$

$$G_{-2}=R_{p-2}-R_p$$

$$G_{-3}=R_{p-3}-R_p$$

$$G_{+23}=R_{p+3}-R_{p+2}$$

$$G_{-23}=R_{p-3}-R_{p-2}.$$

17. A method as in claim 2 wherein a comparison is made of peaks within a part of the signal to determine which of the peaks best meets a predetermined criterion.

18. A method as in claim 2 wherein the predetermined criterion is that the peak is associated with maximum or minimum signal level within a symbol period.

19. A method as in claim 2 wherein the digital data signal has multiple data levels.

20. A method as in claim 2 wherein the digital data signal has been analogue processed to provide a multi-level signal.

21. A method as in claim 20 wherein the analogue processing is quadrature amplitude modulation.

22. A clock recovery system for performing the method described in claim 2.

23. A clock recovery system for recognising timing information from a digital data signal, said system comprising:
   a peak detector for establishing the occurrence of a peak in a part of the signal;
   a peak evaluator for determining the suitability of the peak for providing timing information; and
   means for providing timing information for updating a clock only upon the occurrence of a suitable peak in the digital data signal.

* * * * *